United States Patent [19]
Bailey et al.

[11] Patent Number: 5,569,039
[45] Date of Patent: Oct. 29, 1996

[54] ELECTRICAL CONNECTORS

[75] Inventors: William R. Bailey, Glen Ellyn; Antonio A. Garay, Norridge; Keith A. Rosborough, St. Charles, all of Ill.

[73] Assignee: Labinal Components and Systems, Inc., Elk Grove Village, Ill.

[21] Appl. No.: 372,011

[22] Filed: Jan. 12, 1995

Related U.S. Application Data

[62] Division of Ser. No. 182,641, Jan. 14, 1994, Pat. No. 5,382,169.

[51] Int. Cl.⁶ .................................................. H01R 9/09
[52] U.S. Cl. .................................................. 439/76.1
[58] Field of Search .................... 439/66, 76.1, 91, 439/700, 824

[56] References Cited

U.S. PATENT DOCUMENTS

| | | | |
|---|---|---|---|
| 2,853,656 | 9/1958 | Dowds | 439/66 |
| 3,134,954 | 5/1964 | Braun | 338/66 |
| 3,616,532 | 11/1971 | Beck | 29/625 |
| 3,835,381 | 9/1974 | Garretson et al. | 324/158 |
| 4,029,375 | 6/1977 | Gabrielian | 439/66 |
| 4,257,661 | 3/1981 | Dalamangas et al. | 439/66 |
| 4,471,339 | 9/1984 | Fukada et al. | 338/162 |
| 4,528,500 | 7/1985 | Lightbody et al. | 439/66 |
| 4,707,657 | 11/1987 | Boegh-Petersen | 324/158 |
| 4,899,256 | 2/1990 | Sway-Tin | 361/715 |
| 4,922,376 | 5/1990 | Pommer et al. | 361/715 |
| 4,988,306 | 1/1991 | Hopfer, III et al. | 439/66 |
| 4,992,053 | 2/1991 | Lindeman et al. | 439/66 |
| 5,013,249 | 5/1991 | Lindeman et al. | 439/66 |
| 5,127,837 | 7/1992 | Shah et al. | 439/71 |
| 5,127,838 | 7/1992 | Zanderej et al. | 439/74 |
| 5,282,111 | 1/1994 | Hopfer | 361/704 |
| 5,382,169 | 1/1995 | Bailey et al. | 439/76.2 |

FOREIGN PATENT DOCUMENTS

| | | |
|---|---|---|
| 0248521 | 4/1987 | European Pat. Off. . |

OTHER PUBLICATIONS

Color photocopies of three photographs of an automotive engine connector device or ignition module.

*Primary Examiner*—Neil Abrams
*Attorney, Agent, or Firm*—Leydig, Voit & Mayer, Ltd.

[57] ABSTRACT

Electrical connector devices are provided for interconnecting external conductors with a connecting member such as a circuit which has upwardly projecting components that are adjacent contact areas on an exposed surface. The connector device comprises an insulator body for supporting a plurality of conductor elements in spaced relation to one another. The insulator body includes a plurality of cantilever hollow projections which have a length that exceeds the height of the components above the contact surfaces. The projections extend from the conductor sites generally parallel to one another and are disposed to mate the contact surfaces while providing spaces therearound to receive and accommodate the components. The insulator body preferably is a unitary molded body which includes the projections. An axially compressible conductive means extends through each of the hollow projections from the respective conductor site to an exposed end at the distal end of the respective projection. Preferably each compressible conductive means includes a wadded wire contact button and an exposed end plunger.

67 Claims, 4 Drawing Sheets

ELECTRICAL CONNECTORS

This is a divisional of application Ser. No. 08/182,641, filed Jan. 14, 1994, now U.S. Pat. No. 5,382,169 dated Jan 17, 1995.

This invention relates to electrical connectors and particularly to electrical connector devices for making direct connections between a plurality of external conductors and the leads on a device which has exposed contact areas and adjacent components that extend above the contact areas, such as on a hybrid circuit or printed circuit board. The illustrated preferred embodiment is an engine control connector assembly for mounting and connecting a control circuit to an automotive engine.

BACKGROUND OF THE INVENTION

Hybrid circuits, integrated circuit chips, printed circuit boards and like devices, which will be referred to as circuits, often have discrete circuit components mounted on and extending above a major planar surface. Conductor traces disposed internally of the device or on its surface interconnect the components and provide access for connection to external circuit conductor leads. In various uses of such devices, a surface on which the components are mounted presents the most readily accessible area for joining external conductors. One example is in automotive engine connector devices wherein a control circuit or hybrid circuit is mounted on a heat sink plate. In the past, wire leads were soldered or welded to contact lugs provided on the front face of the control device, between upstanding circuit components, and to external connector leads in the connector device.

The soldered or welded connection techniques are tedious and expensive. For example, the soldered or welded connections are prone to failure during the manufacturing of the device and during the use of the device by the customer. These failures result in higher manufacturing costs due to rejects and in higher costs due to warranty claims and customer dissatisfaction. The failure or the reduction in the integrity of the soldered or welded connections can occur due to vibration, shock, thermal stress and mechanical stress. Furthermore, the manufacture and assembly of the devices, including the soldering or welding operation, is time consuming and expensive in comparison to the present invention.

In addition, the upstanding components on the exposed surfaces of such devices present impediments to application of alternative simplified connective techniques, e.g. such as are disclosed in U.S. Pat. Nos. 4,988,306, 4,992,053, 5,013, 249 5,127,837.

It is an object of this invention to provide improved connector devices and connectors for effecting electrical connections with chips, circuits and boards bearing upstanding components as referred to above.

It is a further object of this invention to provide such connector devices and connectors by which such connections can be effected easily and inexpensively.

SUMMARY OF THE INVENTION

Electrical connector devices are provided for interconnecting external conductors with a connecting member such as a circuit which has upwardly projecting components that are adjacent contact areas on an exposed surface. The connector device comprises an insulator body for supporting a plurality of conductor elements in spaced relation to one another. The insulator body includes a plurality of cantilever hollow projections which have a length that exceeds the height of the components above the contact surfaces. The projections extend from the conductor sites generally parallel to one another and are disposed to mate the contact surfaces while providing spaces therearound to receive and accommodate the components. The insulator body preferably is a unitary molded body which includes the projections. An axially compressible conductive means extends through each of the hollow projections from the respective conductor site to an exposed end at the distal end of the respective projection. Preferably each compressible conductive means includes a wadded wire contact button and an exposed end plunger. Direct conductive connection between the external conductors and the contact surfaces of the connecting member are obtained by pressing the connector device and connecting member together with the projections aligned with the contact surfaces and the components being accommodated beside the projections.

Other objects and advantages of the invention will become apparent upon reading the following detailed description and appended claims, and upon reference to the accompanying drawings.

DETAILED DESCRIPTION OF EMBODIMENTS OF THE INVENTION

Referring to the enclosed drawings, the connector device 16 includes basically a molded frame body 20 which includes a pair of sockets 22 and 24 and which forms a recess or a well 26 in one side of the body between these sockets. Several conductor strips 28, 30 form contact prongs 28p, 30pin the sockets 22 and 24 and extend to predetermined positions in the body wall 27 at the inner side of the recess 26. Other than the prong-ends 28p, 30p which are exposed for engagement with suitable plug-in types of circuit connectors that mate in the sockets 22, 24, the conductors 28, 30 are embedded in the molded body 20.

Within the well 26, the body 20 includes hollow cylindrical chimney-like projections 34 which extend parallel to one another from the wall 27. One of these projections is aligned with each of the conductors 28, 30. The body defines a bore, opening or aperture 36 which extends from the outer distal end of each of these projections to the respective conductor 28, 30, with the conductor being exposed at the inkier end of that bore; see particularly FIGS. 9, 12, 13 and 14.

Figure 12:
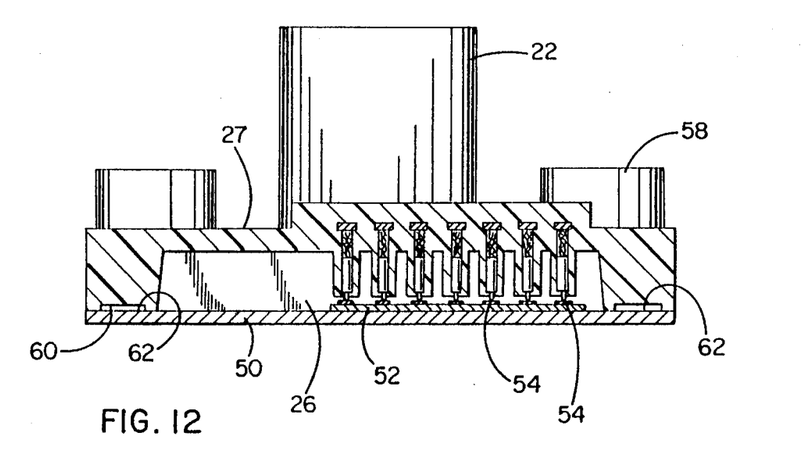
FIGS. 12 and 14 are cross-sectional views corresponding to FIGS. 7 and 8 respectively, each including the circuit and plate in position with a contact pad of the circuit beneath each of the plunger points.
Figure 13:
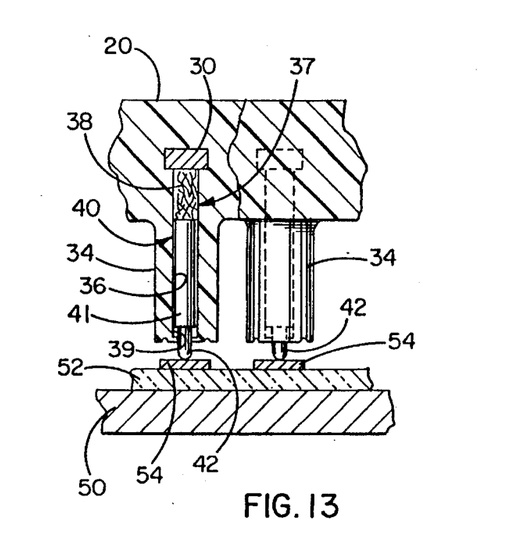
FIG. 13 is an enlarged partial cross-sectional view corresponding to FIG. 9, with the buttons and plungers in place, the end of the contact projections staked inward to retain the plungers and with the corresponding portions of the plate and circuit assembled thereagainst.
Figure 14:
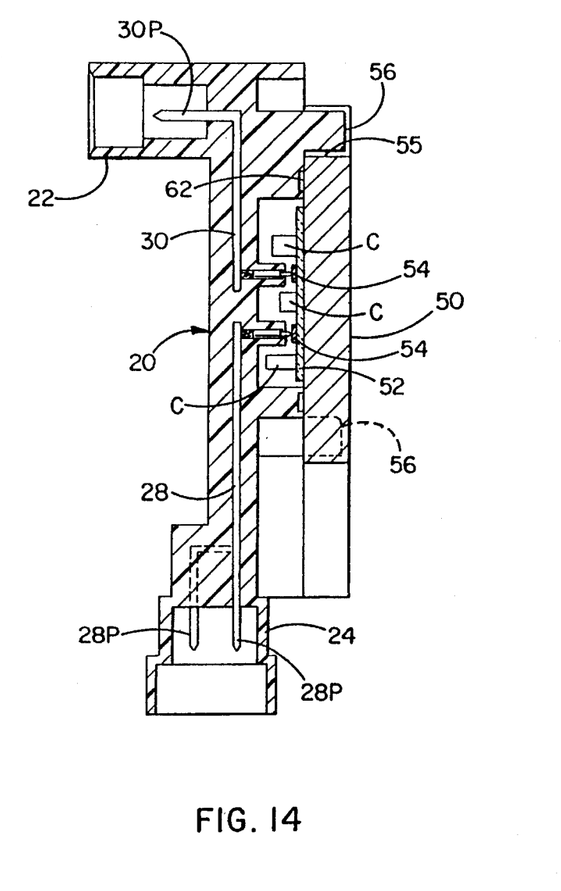

As further illustrated in FIGS. 11, 12, 13 and 14, an axially resilient button-plunger column contact 37, comprising a resilient wadded wire button 38 and a reciprocal plunger 40, is mounted in each of the bores 36. U.S. Pat. No. 5,127,837 further illustrates and describes contacts using similar combinations of resilient wire buttons and reciprocal plungers, and its disclosure thereof is incorporated herein by this reference. The buttons 38 and plungers 40 are mounted by insertion into the open ends of the bores 36. Then the outer ends of the projections are modified, as by cold-form staking inwardly, as at 39 in FIG. 13, to retain the larger body portion 41 of the plunger 40 in the respective bore 36 while permitting free passage of the smaller diameter end portion 42 as illustrated in FIGS. 12, 13 and 14. The buttons 38 and plungers 40 are sufficiently freely movable axially of the bores 36 such that the buttons 38 maintain contact with the adjacent surface of the respective conductor 28, 30 and with the inward end of the respective plunger 40 while permitting and providing resilient axial movement of each plunger within the ambit of axial movement corresponding generally to the length of the projecting end 42.

Figures 1, 2, 3, 11:
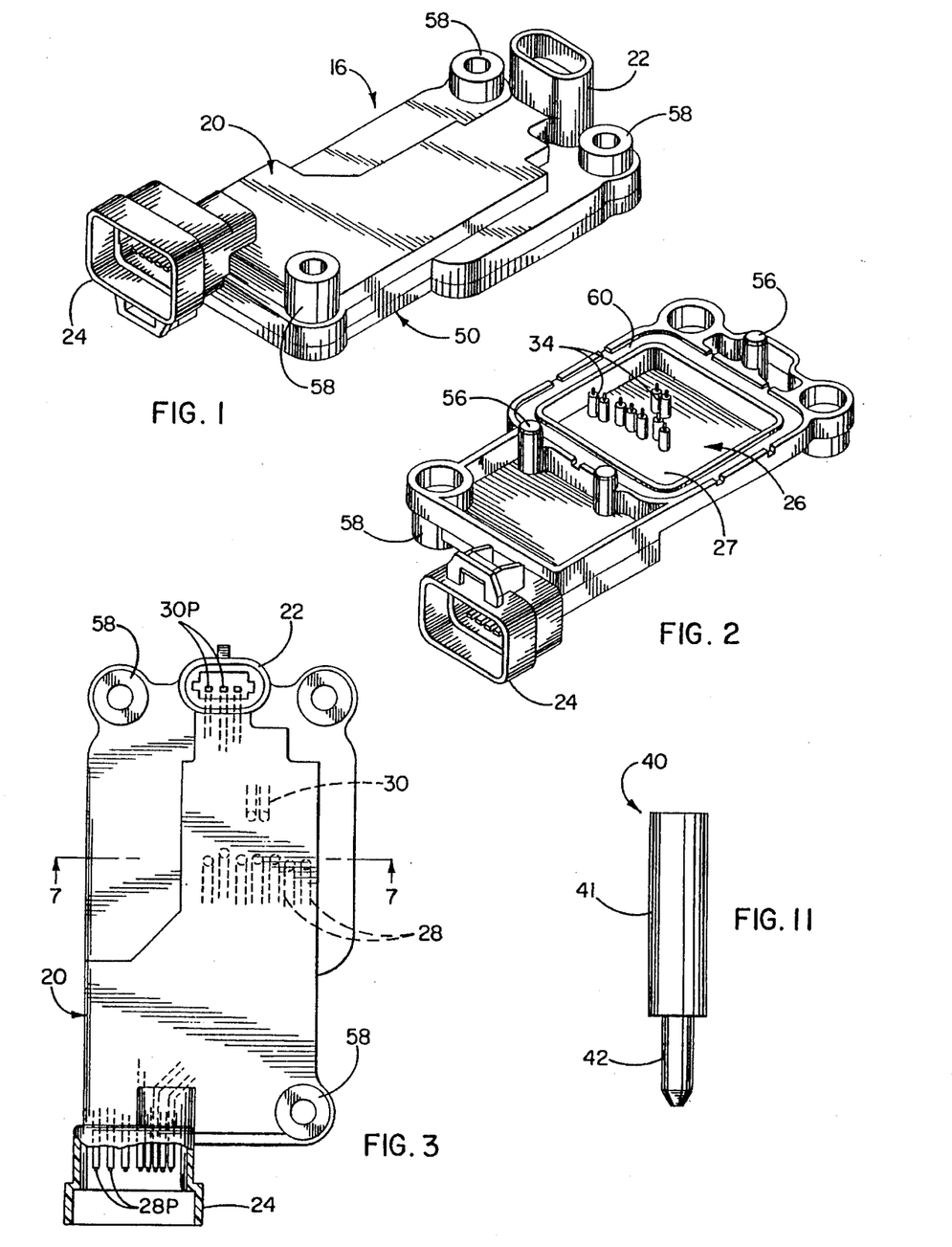
FIG. 1 is a perspective view of an electrical connector employing teachings of this invention.
FIG. 2 is a perspective of the opposite side of the connector device of FIG. 1, with the cover plate and circuit removed.
FIGS. 3–6 are a top view, a left side view, a right side view and a bottom view of the connector device of FIG. 2, respectively.
FIG. 11 is an enlarged side view of a plunger contact element of the connector of FIG. 1.
Figure 4:
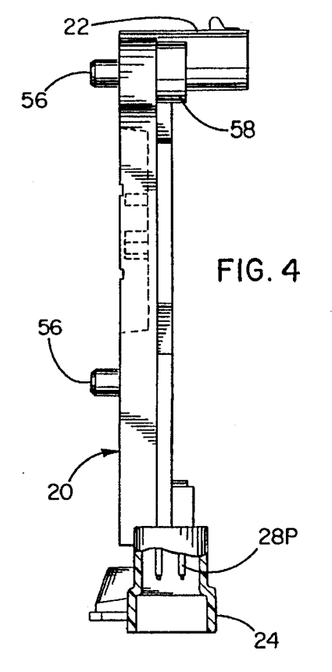
Figure 5:
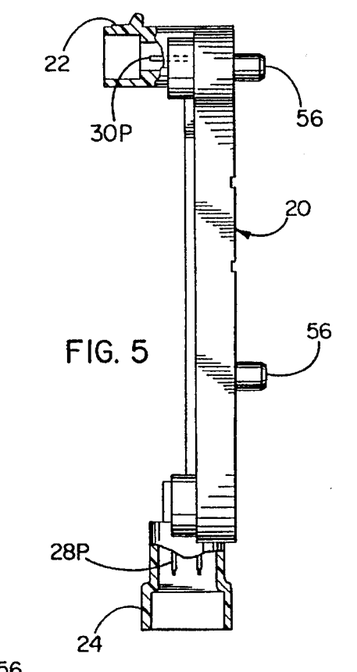
Figure 6:
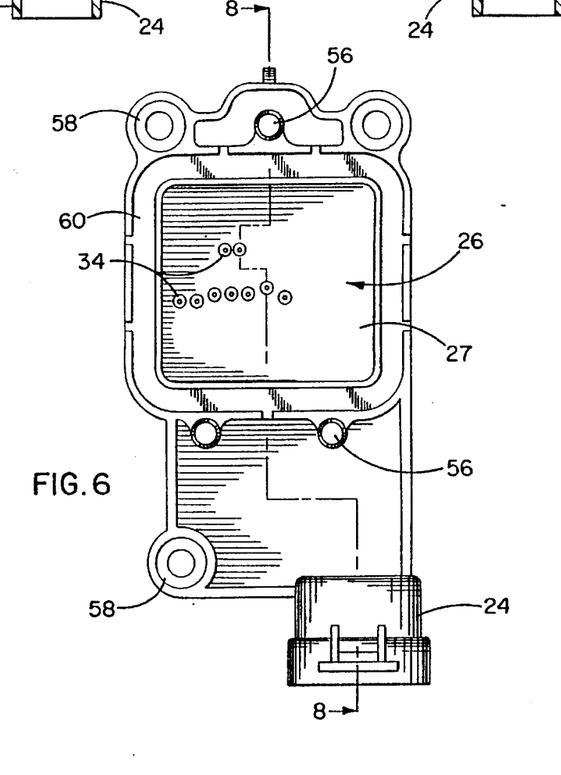
Figure 7:
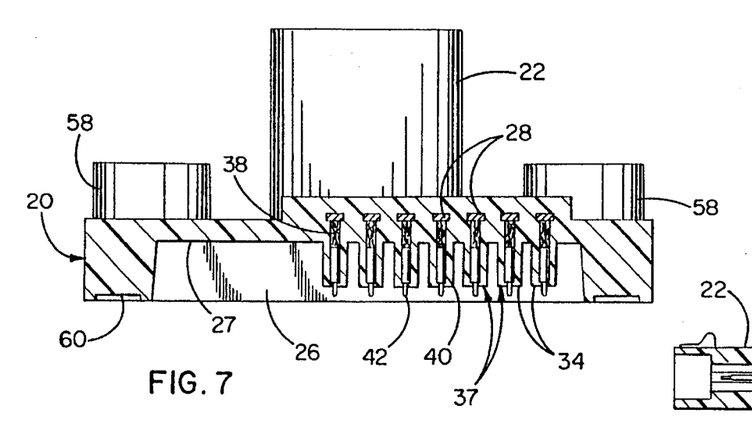
FIG. 7 is an enlarged cross-sectional view taken on line 7—7 of FIG. 3.
Figure 8:
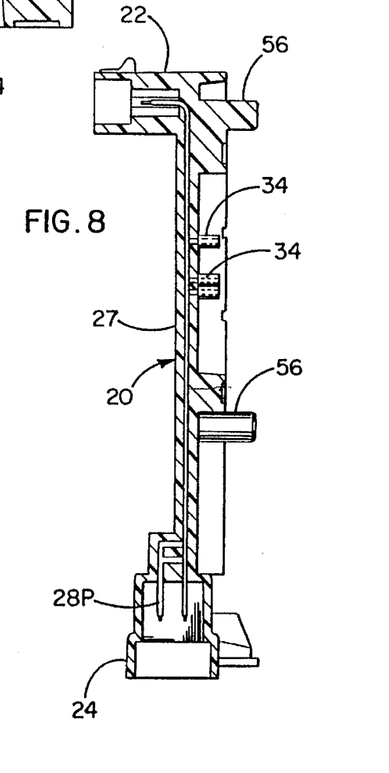
FIG. 8 is an enlarged longitudinal cross-sectional view taken on irregular line 8—8 of FIG. 6, with the projection contacts omitted.
Figure 9:
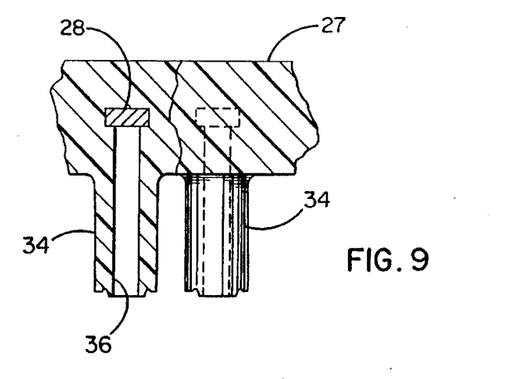
FIG. 9 is a further enlarged partial cross-sectional and side view of two adjacent contact projections generally as seen along line 7—7 in FIG. 3.
Figure 10:
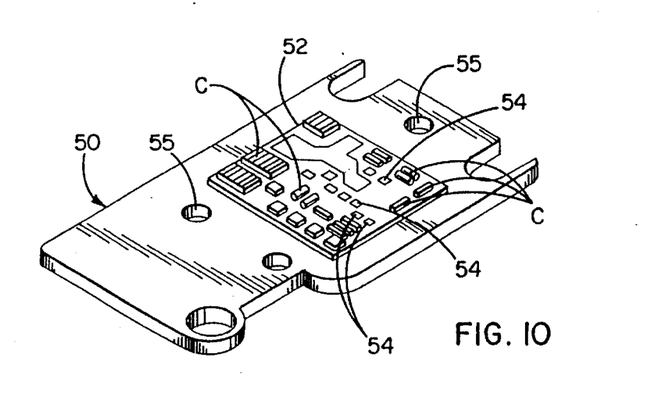
FIG. 10 is a perspective view of a cover plate and a circuit thereon for connecting with the device of FIG. 1.

A metal mounting cover plate 50 as in FIG. 10 carries a circuit 52 adhered to its inward surface. The circuit 52 includes a number of electronic control components C and appropriate conductors (not shown) which connect those components to one another and to contact pads 54 exposed on the inward face of the circuit, among the electrical components C. The conductors of the circuit 52 may be traces on the surface or within laminations of the circuit. The location of the projections 34 carrying contacts 38, 40 are correlated to the location of the respective contact pads 54 such that each conductor 28, 30 is connected to the appropriate portion of the circuit 52 when the plate 50 is mounted on the housing 20 over the recess 26 with the circuit in appropriate registry. Because the projections 34 are of relative small cross-section, they can be and are appropriately located so as to traverse the recess 26 to the respective pad 54 without contacting or interfering with he various components C which extend from the circuit upwardly into the recess 26 beside and among the projections 34.

The metal cover plate 50 serves as a heat sink and transfer path. Slots or openings 55 mate with pins 56 on the body 20 for registration positioning of the plate 50 and particularly the attached circuit 52 relative to the projections 34. The pins 56 extend through the openings 55 and above the plate 50. The upper portions of the pins 56, which extend above the plate 50, are deformed by a staking process, a rolling process, a spinning process or another appropriate process in order to create a head on the upper portions of the pins 56. The deformation of the upper portions into a head secures the plate 50 and the body 20 together in mating relation. An annular shoulder surface 60 on the body 20, around the recess 26, provides a mating seat for the plate 50. A gasket material is applied to one or both of the mating face 62 of the plate or the body 20 on the shoulder surfaces 60 (FIGS. 12 and 14), to assist in providing a sealed joint therebetween. Securing means, such as screws or bolts, may be applied through openings 58 for mounting the assembled connector, as on an automotive engine. Appropriate circuit leads are attached through connectors that mate at the sockets 22, 24. Also, the recess 26 may be filled with a permanently soft potting compound for further sealing against humidity and environmental factors and to serve as a shock absorber to protect the various components against vibrations applied to the connector in use, such as when mounted on automobile engines.

The frame body 20 can be molded of a thermoplastic material. By way of one specific illustrative example, a frame body 20 is molded of thermoplastic glass reinforced polyester manufactured by Hoechest Celaneseo 26 Main street, Chatham, N.J., U.S.A. under compound number 3310. The body 20 was formed with a well 26 about 2 inches (51 mm) by about 2 inches (51 mm) in plan and about 0.200 inches (5 mm) deep. The inner wall 27 was about 0.200 inches (5 mm) thick, with the conductors 28, 30 approximately at its mid-plane as illustrated in FIGS. 7, 8 and 12–14. The side walls forming surfaces 60 were about 0.300 inches (7.5 mm) thick. The projections 34 were about 0.200 inches (5 mm) long and of about 0.100 inches (2.5 mm) outside diameter, with the apertures 36 being of circular cylindrical configuration of about 0.045 inches (1.1 mm) inside diameter and 0.280 inches (7 mm) length from the adjacent surface of the respective conductor 28, 30 to the distal end of the projection. The projections were spaced about 0.280 inches (7 mm) between rows.

The wadded buttons 38 were formed from Molybdenum wire of 0.002 in (0.05 mm) diameter, with each button being 0.110 inches (2.8 mm) in length and of 0.040 inches (1 mm) nominal outside diameter. Each plunger 40 was formed of brass and had a cylindrical main body 41 of about 0.041 inches (1 mm) outside diameter and about 0.200 inches (5 mm) long, with a central axial projection 42 of about 0.022 inches (0.5 mm) outside diameter and about 0.060 inches (1.5 mm) long.

The circuit 52 was about 1 inch (25 mm) by 1.75 inches (44.5 mm) and 0.040 inches (1 mm) thick with components C extending as much as about 0.100 inches (2.5 mm) from its contact surface which carried the contact pads 54. The circuit 52 was adhered to a planar plate 50 which was seated on the outer shoulders 60 of the well walls. The space between the row of the projections 34 and the space therearound within he well 26 readily accommodated the components C when the contact pads 54 were seated against the resiliently retractable contact ends 42.

In the illustrated preferred embodiment the external conductor leads 28, 30 are molded in place in the body 20. However, it will be appreciated that the conductors may be separately applied, as by insertion in appropriate positioning cavities or channels on the rear wall 27 in registration with the projections 34. It also will be appreciated that the projections 34 may be located in any desired array according to the available locations of the contact surfaces 54 on the device to be connected. The pattern and locations of the external conductors 28, 30 should be correspondingly adjusted to place them in opposed relation to the respective contact surfaces 54, at the inward ends of the apertures 36.

Plunger-button contacts have been described as preferred for obtaining the desired axially compressive conductive contacts because of the wearability and ruggedness of the exposed plunger contact ends. However, other compressible contact core arrangements may be utilized in appropriate circumstances. For example, there may be a fixed core-piece extending from the conductor 28, 30 to the resilient contact column components, such as to the components 38, 40. Also, each resilient contact column may be a single elongated wadded wire button, or a button-slug-button arrangement or a plunger-button-plunger arrangement as in U.S. Pat. Nos. 4,988,306, 4,992,053 and 5,013,249 which are incorporated herein by this reference or other arrangements to provide the desirable resilient compressive and uniform conductive contact action.

It will be seen that electrical connector devices have been provided which meet the objects aforestated. While particular embodiments of the invention have been shown, it will be understood, of course, that the invention is not limited thereto since modifications may be made by those skilled in the art, particularly in light of the foregoing teachings. It is, therefore, contemplated by the appended claims to cover any such modifications as incorporate those features which constitute the essential features of these improvements within the true spirit and scope of the invention.

What is claimed is:

1. An electrical connector device for connecting with a mating connector member that has, on one side thereof, generally planar conductive contact surfaces and outwardly projecting circuit components, said connector device comprising:

an electrical insulator body which has a mounting side that includes a support surface for supporting such a connector member and a recess which extends inward of said body relative to said support surface for receiving said outwardly protruding circuit components of such connector member;

electrical conductors extending within said insulator body;

said insulator body defining an opening extending from each of said electrical conductors to an open distal end closely adjacent the position of a conductive contact surface of such a mating connector member supported on said support surface;

a resilient electrically conductive contact disposed in each of said openings and retained and supported in said insulator body, each of said resilient electrically conductive contacts having a proximal end engaging the respective conductor and a distal end exposed through said distal end of the respective opening and being resiliently compressible axially of the respective opening for compressive engagement with a contact surface of such a mating connector member supported on said surface each of said openings has an inner side wall and said resilient conductive contact is retained and supported by the inner side wall of the respective opening.

2. A connector device as in claim 1 wherein said insulator body includes an outwardly facing external surface which faces such a mating connector body mounted on said body, and said electrical conductor elements are embedded in said body adjacent said external surface.

3. A connector device as in claim 2 wherein said electrical conductor elements are elongated elements which extend generally parallel to said external surface.

4. A connector device as in claim 2 wherein said external surface is a surface of a wall of said body which forms the bottom of said recess whereby said circuit components are accommodated between said connector member and said external surface.

5. A connector as in claim 1 wherein each of said resilient conductive contacts includes a wadded wire element.

6. A connector as in claim 1 wherein each of said resilient conductive contacts includes a plurality of elements and at least one of said elements is a wadded wire element.

7. A connector as in claim 1 wherein each of said resilient conductive contacts includes a wadded wire element which has one end abutting the respective conductor and a plunger element abutting the other end of said wadded wire element, said plunger element being resiliently reciprocable axially of the respective opening by the respective wadded wire element.

8. A connector as in claim 1 wherein said insulator body includes an externally exposed socket, a plurality of prong elements extending within said socket and a corresponding plurality of electrical conductors connected to said prong elements and extending within said insulator body.

9. A connector as in claim 8 wherein said electrical conductors are integral with the respective prong element.

10. A connector as in claim 1 wherein said body is a unitary molded body.

11. A connector as in claim 10 wherein said body is molded of a thermoplastic material.

12. A connector as in claim 1 wherein said distal end of said opening is modified to retain said contact.

13. A connector as in claim 12 wherein said distal end is staked.

14. A connector as in claim 1 wherein said body includes registering portions to position a mating connector member.

15. A connector as in claim 14 wherein said registering portions are pins.

16. A connector device for interconnecting external circuits with a mating connector member which includes electrical conductors and has a mating face that includes at least one exposed generally planar conductive contact surface, said connector device comprising:

an electrical insulator body for supporting at least one conductor element and having an external surface for receiving such a mating connector member thereover with said planar conductive contact surface exposed toward said electrical insulator body, at least one electrical conductor element which includes a portion disposed within said insulator body and a prong extending externally of said body for engagement by a conductor of an external circuit, said insulator body defining an opening extending from each said electrical conductor element therein to an open distal end closely adjacent the position of such a mating connector member supported on said device, and a resilient electrically conductive contact disposed in each of said openings and retained and supported in said insulator body, each of said resilient electrically conductive contacts having a proximal end engaging the respective conductor and a distal end exposed through said distal end of the respective opening and being resiliently compressible axially of the respective opening for compressive engagement with a contact surface of such a mating connector member mounted on said device each of said openings has an inner side wall and said resilient conductive contact is retained and supported by the inner side wall of the respective opening.

17. A connector device as in claim 16 wherein each of said resilient conductive contacts includes a wadded wire button element.

18. A connector device as in claim 16 wherein each of said resilient conductive contacts includes a plurality of elements and at least one of said elements is a wadded wire button element.

19. A connector device as in claim 16 wherein each of said resilient conductive contacts includes a wadded wire button element which has one end abutting the respective conductor element and a plunger element abutting the other end of said wadded wire button element, said plunger element being resiliently reciprocable axially of the respective opening by the respective wadded wire button element.

20. A connector device as in claim 16 for interconnecting with such a mating connector member which also has outwardly projecting circuit components on the same side thereof as said planar conductive contact surface, wherein said insulator body includes portions for supporting such a mating connector member in spaced relation to said external surface to accommodate said circuit components between said connector member and said external surface.

21. A connector device as in claim 20 wherein said electrical conductor element is embedded in said body adjacent said external surface.

22. A connector device as in claim 21 wherein said electrical conductor element is an elongated element which extends generally parallel to said external surface.

23. A connector as in claim 16 wherein said insulator body includes an externally exposed socket, said prong element extending within said socket and a corresponding electrical conductor connected to said prong element and extending within said insulator body.

24. A connector as in claim 23 wherein said electrical conductor is integral with the respective prong element.

25. A connector as in claim 16 wherein said body is a unitary molded body.

26. A connector as in claim 25 wherein said body is molded of a thermoplastic material.

27. A connector as in claim 16 wherein said distal end of said opening is modified to retain said contact.

28. A connector as in claim 27 wherein said distal end is staked.

29. A connector device as in claim 16 wherein said body includes registering portions to position a mating connector member.

30. A connector as in claim 29 wherein said registering portions are pins.

31. A connector device for interconnecting external circuits with a mating connector member which includes electrical conductors and has a mating face that includes generally planar conductive contact surfaces, said connector device comprising:
- an electrical insulator body having one wall with an external surface for receiving such a mating connector member thereover,
- at least one externally prong element exposed for engagement by a conductor of an external circuit connector,
- an electrical conductor joined to each of said prong elements and extending within said insulator body adjacent said wall,
- said insulator body defining openings extending from said electrical conductors through said wall surface, and
- a resilient electrically conductive contact disposed in each of said openings and retained and supported in said insulator body, each of said resilient electrically conductive contacts having a proximal end engaging the respective conductor and a distal end exposed through said wall surface and being resiliently compressible axially of the respective opening for compressive engagement with a contact surface of such a mating connector member disposed over said wall surface
- each of said openings has an inner side wall and said resilient conductive contact is retained and supported by the inner side wall of the respective opening.

32. A connector device as in claim 31 wherein said electrical conductor is an elongated conductor disposed within said insulator body generally parallel to said external surface.

33. A connector device as in claim 31 wherein each of said resilient conductive contacts includes a wadded wire button element.

34. A connector device as in claim 31 wherein each of said resilient conductive contacts includes a plurality of elements and at least one of said elements is a wadded wire button element.

35. A connector device as in claim 31 wherein each of said resilient conductive contacts includes a wadded wire button element which has one end abutting the respective conductor and a plunger element abutting the other end of said wadded wire button element, said plunger element being resiliently reciprocable axially of the respective opening by the respective wadded wire button element.

36. A connector device as in claim 31 wherein said insulator body includes an externally exposed socket, a plurality of said prong elements extending within said socket and a corresponding plurality of electrical conductors connected to said prong elements and extending within said insulator body.

37. A connector device as in claim 36 wherein said electrical conductors are integral with the respective prong element.

38. A connector as in claim 31 wherein said body is a unitary molded body.

39. A connector as in claim 38 wherein said body is molded of a thermoplastic material.

40. A connector as in claim 31 wherein said distal end of said opening is modified to retain said contact.

41. A connector as in claim 40 wherein said distal end is staked.

42. A connector device as in claim 31 wherein said body includes registering portions to position a mating connector member.

43. A connector as in claim 42 wherein said registering portions are pins.

44. An electrical connector assembly comprising:
- a connector member that has, on one side thereof, generally planar conductive contact surfaces and outwardly projecting circuit components;
- an electrical insulator body which has a mounting side that includes a support surface, said connector member being supported on said support surface, said body having a recess which extends inward of said body relative to said support surface and in which said outwardly protruding circuit components of such connector member are disposed;
- electrical conductors extending within said insulator body;
- said insulator body including portions which extend from adjacent said electrical connectors to adjacent said conductive contact surfaces of said connector member and define an opening extending from each of said electrical conductors to an open distal end closely adjacent the position of a respective one of said conductive contact surfaces; and a resilient electrically conductive contact disposed in each of said openings, each of said resilient electrically conductive contacts having a proximal end engaging the respective conductor and a distal end engaging the respective contact surface, said conductive contact elements being resiliently compressible axially of the respective opening for compressive engagement with the respective contact surface of said mating connector member each of said openings has an inner side wall and said resilient conductive contact is retained and supported by the inner side wall of the respective opening.

45. An electrical connector assembly as in claim 44 in which said connector member includes a heat sink and a circuit mounted on said heat sink, said circuit including said generally planar contact surfaces and said outwardly protruding circuit components.

46. A connector device as in claim 44 wherein each of said resilient conductive contacts includes a plurality of elements and at least one of said elements is a wadded wire button element.

47. A connector device as in claim 44 wherein each of said resilient conductive contacts includes a wadded wire button element which has one end abutting the respective conductor element and a plunger element abutting the other end of said wadded wire button element, said plunger element being resiliently reciprocable axially of the respective opening by the respective wadded wire button element.

48. A connector as in claim 44 wherein said insulator body includes an externally exposed socket, a plurality of prong elements extending within said socket and a corresponding plurality of electrical conductors connected to said prong elements and extending within said insulator body.

49. A connector as in claim 48 wherein said electrical conductors are integral with the respective prong element.

50. A connector as in claim 44 wherein each of said resilient conductive contacts includes a wadded wire element.

51. A connector as in claim 44 wherein a gasket material is located between said support surface and said connector member.

52. A connector as in claim 44 wherein a potting material is located in said recess.

53. A connector as in claim 45 wherein said circuit is an engine control circuit.

54. A connector as in claim 44 wherein said body is a unitary molded body.

55. A connector as in claim 54 wherein said body is molded of a thermoplastic material.

56. A connector as in claim 44 wherein said distal end of said opening is modified to retain said contact.

57. A connector as in claim 56 wherein said distal end is staked.

58. A connector device as in claim 44 wherein said body includes registering portions to position a mating connector member.

59. A connector as in claim 58 wherein said registering portions are pins.

60. A connector device for interconnecting external circuits with a mating connector member which includes electrical conductors and has a mating face that includes at least one exposed generally planar conductive contact surface, said connector device comprising:

an electrical insulator body for supporting at least one conductor element and having an external surface for receiving such a mating connector member thereover with said planar conductive contact surface exposed toward said electrical insulator body, at least one electrical conductor element which includes a portion disposed within said insulator body and a prong extending externally of said body for engagement by a conductor of an external circuit, said insulator body defining an opening extending from each said electrical conductor element therein to an open distal end closely adjacent the position of such a mating connector member supported on said device, and a resilient electrically conductive contact disposed in each of said openings and retained and supported in said insulator body, each of said resilient electrically conductive contacts having a proximal end engaging the respective conductor and a distal end exposed through said distal end of the respective opening and being resiliently compressible axially of the respective opening for compressive engagement with a contact surface of such a mating connector member mounted on said device each of said resilient conductive contacts includes a wadded wire button element which has one end abutting the respective conductor element and a plunger element abutting the other end of said wadded wire button element, said plunger element being resiliently reciprocable axially of the respective opening by the respective wadded wire button element.

61. A connector device for interconnecting external circuits with a mating connector member which includes electrical conductors and has a mating face that includes generally planar conductive contact surfaces, said connector device comprising:

an electrical insulator body having one wall with an external surface for receiving such a mating connector member thereover, at least one externally prong element exposed for engagement by a conductor of an external circuit connector, an electrical conductor -joined to each of said prong elements and extending within said insulator body adjacent said wall, said insulator body defining openings extending from said electrical conductors through said wall surface, and a resilient electrically conductive contact disposed in each of said openings and retained and supported in said insulator body, each of said resilient electrically conductive contacts having a proximal end engaging the respective conductor and a distal end exposed through said wall surface and being resiliently compressible axially of the respective opening for compressive engagement with a contact surface of such a mating connector member disposed over said wall surface each of said resilient conductive contacts includes a wadded wire button element which has one end abutting the respective conductor and a plunger element abutting the other end of said wadded wire button element, said plunger element being resiliently reciprocable axially of the respective opening by the respective wadded wire button element.

62. An electrical connector assembly comprising:

a connector member that has, on one side thereof, generally planar conductive contact surfaces and outwardly projecting circuit components;

an electrical insulator body which has a mounting side that includes a support surface, said connector member being supported on said support surface, said body having a recess which extends inward of said body relative to said support surface and in which said outwardly protruding circuit components of such connector member are disposed;

electrical conductors extending within said insulator body;

said insulator body including portions which extend from adjacent said electrical connectors to adjacent said conductive contact surfaces of said connector member and define an opening extending from each of said electrical conductors to an open distal end closely adjacent the position of a respective one of said conductive contact surfaces; and a resilient electrically conductive contact disposed in each of said openings, each of said resilient electrically conductive contacts having a proximal end engaging the respective conductor and a distal end engaging the respective contact surface, said conductive contact elements being resiliently compressible axially of the respective opening for compressive engagement with the respective contact surface of said mating connector member each of said resilient conductive contacts includes a wadded wire button element which has one end abutting the respective conductor element and a plunger element abutting the other end of said wadded wire button element, said plunger element being resiliently reciprocable axially of the respective opening by the respective wadded wire button element.

63. An electrical connector device for connecting with a mating connector member that has, on one side thereof, generally planar conductive contact surfaces and outwardly projecting circuit components, said connector device comprising:

an electrical insulator body which has a mounting side that includes a support surface for supporting such a connector member and a recess which extends inward of said body relative to said support surface for receiving said outwardly protruding circuit components of such connector member;

electrical conductors extending within said insulator body;

said insulator body defining an opening extending from each of said electrical conductors to an open distal end closely adjacent the position of a conductive contact surface of such a mating connector member supported on said support surface;

a resilient electrically conductive contact disposed in each of said openings and retained and supported in said insulator body, each of said resilient electrically conductive contacts having a proximal end engaging the respective conductor and a distal end exposed through said distal end of the respective opening and being resiliently compressible axially of the respective opening for compressive engagement with a contact surface of such a mating connector member supported on said surface each of said resilient conductive contacts includes a wadded wire button element which has one end abutting the respective conductor and a plunger element abutting the other end of said wadded wire button element, said plunger element being resiliently reciprocable axially of the respective opening by the respective wadded wire button element.

64. An electrical connector device for connecting with a mating connector member that has, on one side thereof, generally planar conductive contact surfaces and outwardly projecting circuit components, said connector device comprising:

an electrical insulator body which has a mounting side that includes a support surface for supporting such a connector member and a recess which extends inward of said body relative to said support surface for receiving said outwardly protruding circuit components of such connector member;

electrical conductors extending within said insulator body;

said insulator body defining an opening extending from each of said electrical conductors to an open distal end closely adjacent the position of a conductive contact surface of such a mating connector member supported on said support surface;

a resilient electrically conductive contact disposed in each of said openings and retained and supported in said insulator body, each of said resilient electrically conductive contacts having a proximal end engaging the respective conductor and a distal end exposed through said distal end of the respective opening and being resiliently compressible axially of the respective opening for compressive engagement with a contact surface of such a mating connector member supported on said surface each of said resilient conductive contacts includes a wadded wire element.

65. A connector device for interconnecting external circuits with a mating connector member which includes electrical conductors and has a mating face that includes at least one exposed generally planar conductive contact surface, said connector device comprising:

an electrical insulator body for supporting at least one conductor element and having an external surface for receiving such a mating connector member thereover with said planar conductive contact surface exposed toward said electrical insulator body, at least one electrical conductor element which includes a portion disposed within said insulator body and a prong extending externally of said body for engagement by a conductor of an external circuit, said insulator body defining an opening extending from each said electrical conductor element therein to an open distal end closely adjacent the position of such a mating connector member supported on said device, and a resilient electrically conductive contact disposed in each of said openings and retained and supported in said insulator body, each of said resilient electrically conductive contacts having a proximal end engaging the respective conductor and a distal end exposed through said distal end of the respective opening and being resiliently compressible axially of the respective opening for compressive engagement with a contact surface of such a mating connector member mounted on said device each of said resilient conductive contacts includes a wadded wire element.

66. A connector device for interconnecting external circuits with a mating connector member which includes electrical conductors and has a mating face that includes generally planar conductive contact surfaces, said connector device comprising:

an electrical insulator body having one wall with an external surface for receiving such a mating connector member thereover, at least one externally prong element exposed for engagement by a conductor of an external circuit connector, an electrical conductor joined to each of said prong elements and extending within said insulator body adjacent said wall, said insulator body defining openings extending from said electrical conductors through said wall surface, and a resilient electrically conductive contact disposed in each of said openings and retained and supported in said insulator body, each of said resilient electrically conductive contacts having a proximal end engaging the respective conductor and a distal end exposed through said wall surface and being resiliently compressible axially of the respective opening for compressive engagement with a contact surface of such a mating connector member disposed over said wall surface each of said resilient conductive contacts includes a wadded wire element.

67. An electrical connector assembly comprising:

a connector member that has, on one side thereof, generally planar conductive contact surfaces and outwardly projecting circuit components;

an electrical insulator body which has a mounting side that includes a support surface, said connector member being supported on said support surface, said body having a recess which extends inward of said body relative to said support surface and in which said outwardly protruding circuit components of such connector member are disposed;

electrical conductors extending within said insulator body;

said insulator body including portions which extend from adjacent said electrical connectors to adjacent said conductive contact surfaces of said connector member and define an opening extending from each of said electrical conductors to an open distal end closely adjacent the position of a respective one of said conductive contact surfaces; and a resilient electrically conductive contact disposed in each of said openings, each of said resilient electrically conductive contacts having a proximal end engaging the respective conductor and a distal end engaging the respective contact surface, said conductive contact elements being resiliently compressible axially of the respective opening for compressive engagement with the respective contact surface of said mating connector member each of said resilient conductive contacts includes a wadded wire element.

\* \* \* \* \*

UNITED STATES PATENT AND TRADEMARK OFFICE
CERTIFICATE OF CORRECTION

PATENT NO. : 5,569,039

DATED : October 29, 1996

INVENTOR(S) : William R. Bailey et al.

It is certified that error appears in the above-indentified patent and that said Letters Patent is hereby corrected as shown below:

Col. 3, line 12, "inkier" should read --inner--

In the claims:

In Column 10, line 37, "-joined" should read --joined--

Signed and Sealed this

Eleventh Day of February, 1997

Attest:

BRUCE LEHMAN

Attesting Officer    Commissioner of Patents and Trademarks